(12) United States Patent
Guizilini et al.

(10) Patent No.: US 12,347,125 B2
(45) Date of Patent: Jul. 1, 2025

(54) USING HISTOGRAMS FOR SELF-SUPERVISED DEPTH ESTIMATION

(71) Applicant: Toyota Research Institute, Inc., Los Altos, CA (US)

(72) Inventors: Vitor Guizilini, Santa Clara, CA (US); Rares A. Ambrus, San Francisco, CA (US); Sergey Zakharov, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 454 days.

(21) Appl. No.: 17/827,201

(22) Filed: May 27, 2022

(65) Prior Publication Data

US 2023/0386060 A1 Nov. 30, 2023

(51) Int. Cl.
*G06T 7/579* (2017.01)
*G06V 10/98* (2022.01)

(52) U.S. Cl.
CPC .............. *G06T 7/579* (2017.01); *G06V 10/98* (2022.01); *G06T 2207/20076* (2013.01); *G06T 2207/20081* (2013.01)

(58) Field of Classification Search
CPC .......... G06T 7/579; G06T 2207/20076; G06T 2207/20081; G06T 2207/20084; G06T 2207/30252; G06T 7/50; G06V 10/98; G06V 10/50; G06V 20/647
See application file for complete search history.

(56) References Cited

U.S. PATENT DOCUMENTS

| 11,429,805 B2 * | 8/2022 | Ren ...................... G06V 30/248 |
| 2017/0127046 A1 * | 5/2017 | Das ...................... H04N 13/239 |
| 2018/0189565 A1 * | 7/2018 | Lukierski ............... B25J 9/1697 |
| 2021/0090277 A1 * | 3/2021 | Guizilini .................. G06N 3/08 |

FOREIGN PATENT DOCUMENTS

| CN | 103413347 B | 7/2016 |
| CN | 111382592 A | 7/2020 |
| CN | 109635723 B | 2/2021 |
| CN | 113050120 A | 6/2021 |
| EP | 3712841 B1 | 8/2021 |

OTHER PUBLICATIONS

C. Godard, O. M. Aodha, M. Firman and G. Brostow, "Digging Into Self-Supervised Monocular Depth Estimation," 2019 IEEE/CVF International Conference on Computer Vision (ICCV), Seoul, Korea (South), pp. 3827-3837 (Year: 2019).*

\* cited by examiner

*Primary Examiner* — Molly Wilburn
(74) *Attorney, Agent, or Firm* — Christopher G. Darrow; Darrow Mustafa PC (57) ABSTRACT

System, methods, and other embodiments described herein relate to an improved approach to training a depth model to derive depth estimates from monocular images using histograms to assess photometric losses. In one embodiment, a method includes determining loss values according to a photometric loss function. The loss values are associated with a depth map derived from an input image that is a monocular image. The method includes generating histograms for the loss values corresponding to different regions of a target image. The method includes, responsive to identifying erroneous values of the loss values, masking the erroneous values to avoid considering the erroneous values during training of the depth model.

17 Claims, 6 Drawing Sheets

USING HISTOGRAMS FOR SELF-SUPERVISED DEPTH ESTIMATION

TECHNICAL FIELD

The subject matter described herein relates, in general, to systems and methods for determining depths of a scene from a monocular image and, more particularly, to training a depth model to derive the depths by using histograms to selectively mask loss values associated with anomalies in an image.

BACKGROUND

Various devices that operate autonomously or that provide information about a surrounding environment use sensors that facilitate perceiving obstacles and additional aspects of the surrounding environment. For example, a robotic device may use information from the sensors to develop an awareness of the surrounding environment in order to navigate through the environment. In particular, the robotic device uses the perceived information to determine a 3-D structure of the environment in order to identify navigable regions and avoid potential hazards.

The ability to perceive distances through estimation of depth using sensor data provides the robotic device with the ability to plan movements through the environment and generally improve situational awareness about the environment. However, depending on the available onboard sensors, the robotic device may acquire a limited perspective of the environment and, thus, encounter difficulties in distinguishing aspects of the environment.

For example, while monocular cameras can be a cost-effective approach to acquiring information about the surroundings, the sensor data from such cameras does not explicitly include depth information. Instead, processing routines derive depth information from the monocular images. However, leveraging monocular images to perceive depth can suffer from various difficulties. Self-supervised depth estimation may be performed by training a depth network to minimize photometric loss. Achieving this generally involves estimating a single depth value per pixel of an image in conjunction with a global transformation between cameras and warping information from one image so that it is re-projected onto another image. The self-supervised signal for performing the training is then in the image space, with gradients attempting to approximate RGB values from the original and warped images. Because some objects in the images may be dynamic with the scene, these objects can cause aberrations within the depth values, such as appearing at an infinite depth when moving with the camera or appearing closer when moving toward the camera. Therefore, while self-supervised training of depth models can be a valuable approach, various difficulties still exist that can impact overall accuracy.

SUMMARY

In one embodiment, example systems and methods relate to an improved approach to training a depth model to derive depth estimates from monocular images using histograms. As noted previously, the process of training a monocular depth estimation model may encounter difficulties in relation to the application of photometric losses to different areas of an image, such as when objects depicted in the images are moving. Accordingly, in at least one approach, a depth system is disclosed that implements a novel approach to training a depth model using histograms to identify regions of an image associated with anomalies from the movement and masking the regions from consideration in the training process, thereby improving training overall.

For example, in one approach, the depth system proceeds with a self-supervised training process by generating a depth map and then photometric loss values. The depth system then generates histograms for different regions associated with the depth map from loss values that are within the regions. Accordingly, the histograms provide a comparison of the loss values for a specific region against possible values, which can show when erroneous values exist within the depth map. Upon identifying the erroneous values, the depth system masks (i.e., removes) the erroneous values from consideration when training the depth model. In this way, the depth system trains the depth model without difficulties encountered in relation to noted anomalies and improves the accuracy of the depth model overall.

In one embodiment, a depth system is disclosed. The depth system includes one or more processors and a memory communicably coupled to the one or more processors. The memory stores instructions that, when executed by the one or more processors, cause the one or more processors to determine loss values according to a photometric loss function. The loss values are associated with a depth map derived from an input image that is a monocular image. The instructions include instructions to generate histograms for the loss values corresponding to different regions of a target image. The instructions include instructions to, responsive to identifying erroneous values of the loss values, mask the erroneous values to avoid considering the erroneous values during training of the depth model.

In one embodiment, a non-transitory computer-readable medium including instructions that, when executed by one or more processors, cause the one or more processors to perform various functions is disclosed. The instructions include instructions to determine loss values according to a photometric loss function. The loss values are associated with a depth map derived from an input image that is a monocular image. The instructions include instructions to generate histograms for the loss values corresponding to different regions of a target image. The instructions include instructions to, responsive to identifying erroneous values of the loss values, mask the erroneous values to avoid considering the erroneous values during training of the depth model.

In one embodiment, a method is disclosed. In one embodiment, the method includes determining loss values according to a photometric loss function. The loss values are associated with a depth map derived from an input image that is a monocular image. The method includes generating histograms for the loss values corresponding to different regions of a target image. The method includes, responsive to identifying erroneous values of the loss values, masking the erroneous values to avoid considering the erroneous values during training of the depth model.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed associated with an improved approach to training a depth model to derive depth estimates from monocular images using histograms to avoid loss values associated with anomalies in a depth map. As noted previously, the process of training a monocular depth estimation model may encounter difficulties in relation to the application of photometric losses to different areas of an image. That is, the photometric loss may be less accurate in some images according to particular aspects of an image that are depicted, such as when objects in the image are in motion. Accordingly, in at least one approach, a depth system is disclosed that implements a novel approach to training a depth model by using histograms to analyze loss values and mask erroneous values from use during the training.

In one approach, the depth system builds a cost volume of a scene that represents different regions, which are different depths and locations therein. For example, the depth system generates depth values and warps the depth values into a common frame of a target image. The frame is divided into the different regions (also referred to as bins), which are three-dimensional cells of a grid. This process may be undertaken for several different images and related to the same frame of the target image. The depth system then uses the warped values in the bins to calculate photometric losses a respective bin. The depth system can then generate histograms for the bins that map the loss values against a range of possible loss values. The histograms then depict distributions of losses for different regions/bins of the depth map. From this information, the depth system can use a mask threshold to determine when loss values within a histogram are erroneous. For example, when the values indicate low loss from being very distant, such as may occur in the case of an object moving at the same speed as the camera and creating an area of infinite depth surrounding by areas that are not. Other instances of erroneous values occur when, for example, other objects are moving longitudinally relative to the camera. In any case, the histograms of the different regions show these disparities according to the comparison with the mask threshold. Therefore, the depth map can then mask (i.e., remove) the erroneous values from the photometric loss values and train the depth model using the remaining loss values that are free from errors. In this way, the depth system trains the depth model without difficulties encountered in relation to dynamic objects and, consequently, improves the training of the depth model.

Figure 1:
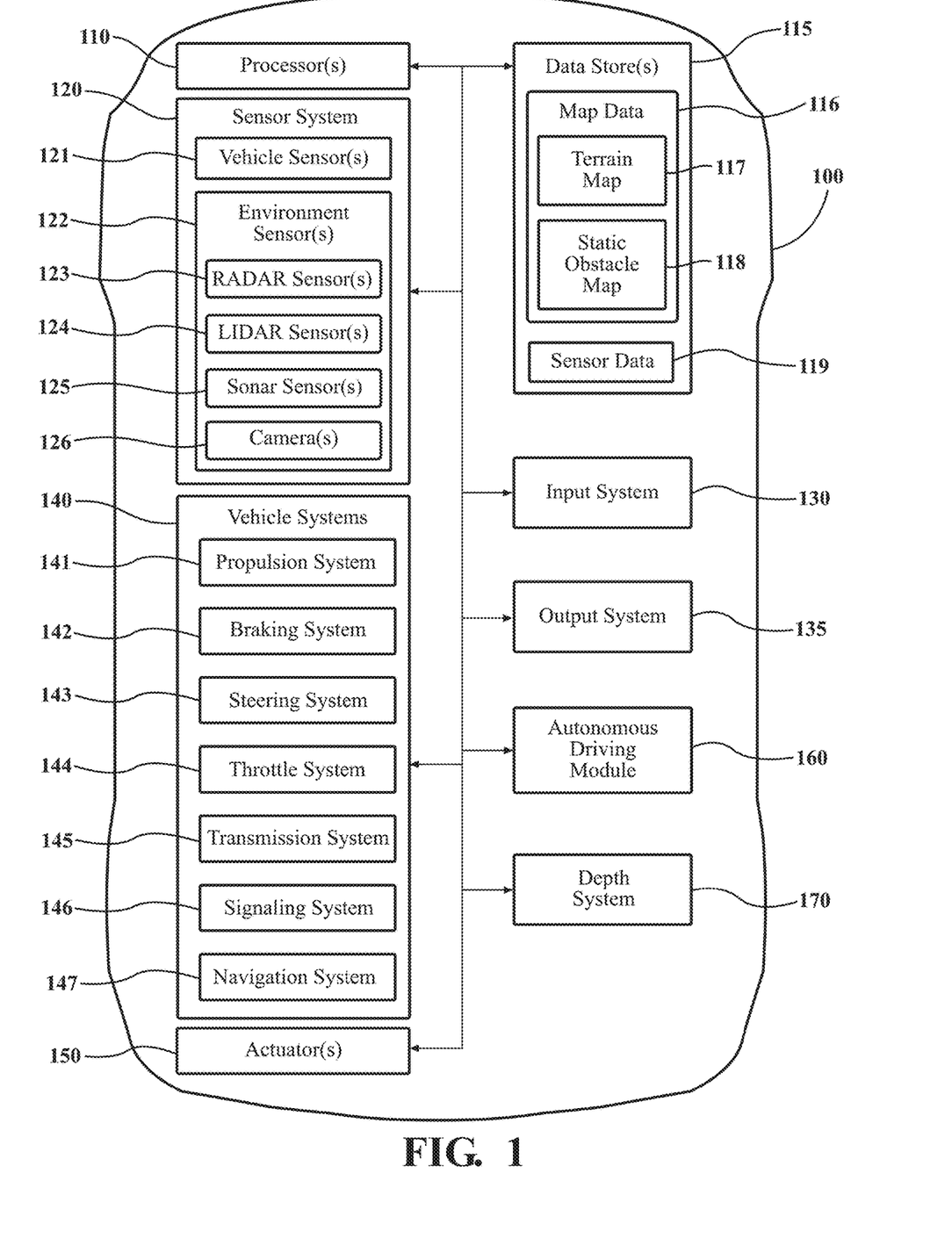
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any electronic device (e.g., smartphone, surveillance camera, robot, etc.) that, for example, perceives an environment according to monocular images, and thus benefits from the functionality discussed herein. In yet further embodiments, the vehicle 100 may instead be a statically mounted device, an embedded device, or another device that uses monocular images to derive depth information about a scene or that separately trains the depth model for deployment in such a device.

In any case, the vehicle 100 (or another electronic device) also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a depth system 170 that functions to train and implement a model to process monocular images and provide depth estimates for an environment (e.g., objects, surfaces, etc.) depicted therein. Moreover, while depicted as a standalone component, in one or more embodiments, the depth system 170 is integrated with the autonomous driving module 160, the camera 126, or another component of the vehicle 100. The noted functions and methods will become more apparent with a further discussion of the figures.

Figure 2:
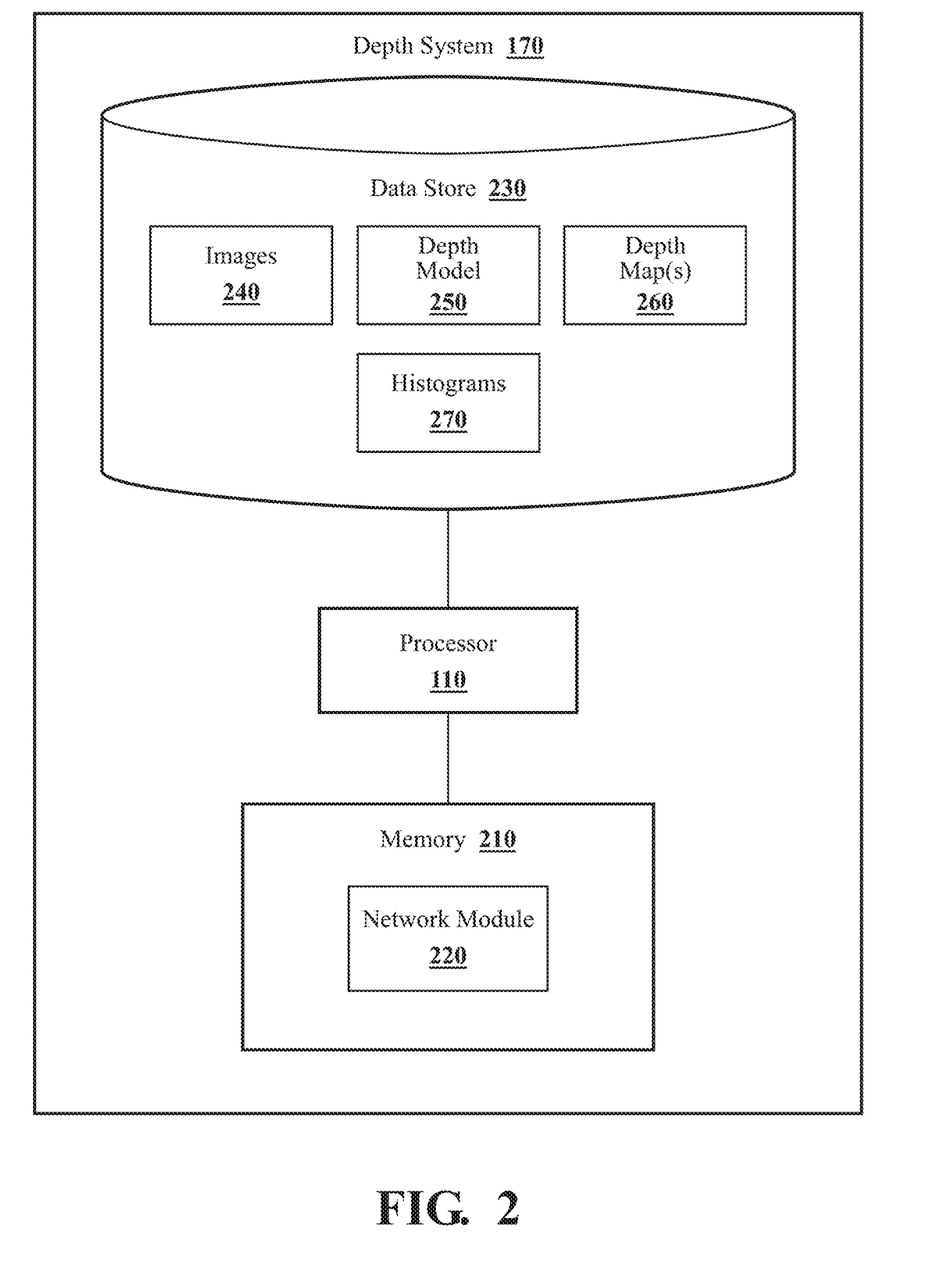
FIG. 2 illustrates one embodiment of a depth system that is associated with training a depth model.

With reference to FIG. 2, one embodiment of the depth system 170 is further illustrated. The depth system 170 is shown as including a processor 110. Accordingly, the processor 110 may be a part of the depth system 170 or the depth system 170 may access the processor 110 through a data bus or another communication path. In one or more embodiments, the processor 110 is an application-specific integrated circuit (ASIC) that is configured to implement functions associated with a network module 220. In general, the processor 110 is an electronic processor such as a microprocessor that is capable of performing various functions as described herein. In one embodiment, the depth system 170 includes a memory 210 that stores the network module 220. The memory 210 is a random-access memory (RAM), read-only memory (ROM), a hard disk drive, a flash memory, or other suitable memory for storing the network module 220. The network module 220 is, for example, computer-readable instructions that, when executed by the processor 110, cause the processor 110 to perform the various functions disclosed herein.

Furthermore, in one embodiment, the depth system 170 includes a data store 230. The data store 230 is, in one embodiment, an electronic data structure, such as a database, that is stored in the memory 210 or another memory, and that is configured with routines that can be executed by the processor 110 for analyzing stored data, providing stored data, organizing stored data, and so on. Thus, in one embodiment, the data store 230 stores data used by the network module 220 in executing various functions. In one embodiment, the data store 230 includes images 240, a depth model 250, depth map(s) 260, and histograms 270 along with, for example, other information that is used by the network module 220.

Training data used by the depth system 170 generally includes one or more monocular videos that are comprised of a plurality of frames in the form of the images 240 that are monocular images. Of course, the images 240 may alternatively be input images for using during inference by the depth model 250. As described herein, a monocular image is, for example, an image from the camera 126 that may be part of a video, and that encompasses a field-of-view (FOV) about the vehicle 100 of at least a portion of the surrounding environment. That is, the monocular image is, in one approach, generally limited to a subregion of the surrounding environment. As such, the image may be of a forward-facing (i.e., the direction of travel) 60, 90, 120-degree FOV, a rear/side facing FOV, or some other subregion as defined by the characteristics of the camera 126.

In any case, the monocular image itself includes visual data of the FOV that is encoded according to a video standard (e.g., codec) associated with the camera 126. In general, the characteristics of the camera 126 and a video standard define a format of the monocular image. Thus, while the particular characteristics can vary according to different implementations, in general, the image has a defined resolution (i.e., height and width in pixels) and format. Thus, for example, the monocular image is generally an RGB visible light image. In further aspects, the monocular image can be an infrared image associated with a corresponding infrared camera, a black/white image, or another suitable format as may be desired. Whichever format that the depth system 170 implements, the images 240 are monocular images in that there is no explicit additional modality indicating depth nor an explicit corresponding image from another camera from which the depth can be derived (i.e., no stereo camera pair). In contrast to a stereo image that may integrate left and right images from separate cameras mounted to generate an overlapping FOV to provide an additional depth channel, the monocular image does not include explicit depth information, such as disparity maps derived from comparing the stereo images pixel-by-pixel. Instead, the monocular image implicitly provides depth information in the relationships of perspective and size of elements depicted therein from which the depth model 250 derives the depth maps 260.

Moreover, the monocular video may include observations of many different scenes, including various dynamic objects (i.e., objects in motion). That is, as the camera 126 or another original source camera of the video progresses through an environment, perspectives of objects and features in the environment change, and the depicted objects/features themselves also change, thereby depicting separate scenes (i.e., particular combinations of objects/features). Thus, the depth system 170 may extract particular training sets of monocular images from the monocular video for training. In particular, the depth system 170 generates the sets of images from the video so that the sets of images are of the same scene and can be related to a common target image. As should be appreciated, the video includes a series of monocular images that are taken in succession according to a configuration of the camera. Thus, the camera may generate the images 240 (also referred to herein as frames) of the video at regular intervals, such as every 0.033 s. That is, a shutter of the camera operates at a particular rate (i.e., frames-per-second (fps) configuration), which may be, for example, 24 fps, 30 fps, 60 fps, etc.

For purposes of the present discussion, the fps is presumed to be 30 fps. However, it should be appreciated that the fps may vary according to a particular configuration. Moreover, the depth system 170 need not generate the images for training from successive ones (i.e., adjacent) of the frames from the video, but instead can generally include separate images of the same scene that are not successive as training images. Thus, in one approach, the depth system 170 selects every other image depending on the fps. In a further approach, the depth system selects every fifth image as a training pair. The greater the timing difference in the video between the images, the more pronounced a difference in camera position; however, this may also result in fewer shared features/objects between the images. As such, as previously noted, the pairs of training images are of a same scene and are generally constrained, in one or more embodiments, to be within a defined number of frames (e.g., 5 or fewer) to ensure correspondence of an observed scene between the monocular training images. In any case, the pairs of training images generally have the attributes of being monocular images from a monocular video that are separated by some interval of time (e.g., 0.06 s) such that a perspective of the camera changes between the pair of training images as a result of the motion of the camera through the environment while generating the video.

Moreover, while the images 240 are described as training images (i.e., for purposes of adapting the depth model 250 to improve accuracy/understanding), the depth system 170 similarly processes images of the same/similar character after training to generate the noted outputs (i.e., the depth maps 260). Thus, during inference and while in use as implemented, the images 240 are instead derived from a monocular camera and may not be associated via a video. Additionally, while the depth model 250 generates a single depth map per image, a pose model accepts inputs of multiple images (e.g., two or more) to produce outputs. Additionally, it should be noted that while the training data is generally characterized as including the images 240 alone, in various implementations, the depth system 170 may also use supplemental training data, such as sparse depth information (e.g., sparse LiDAR scans).

With further reference to FIG. 2, the depth system 170 further includes the depth model 250, which produces the depth maps 260, the pose model, which produces transformations of camera pose between the images 240, and a cost volume, which stores the photometric loss values for a scene using the histograms 270. The depth model 250 and the pose model are, in one embodiment, machine learning algorithms. However, the particular form of either model is generally distinct. That is, for example, the depth model 250 is a machine learning algorithm that accepts an electronic input in the form of a single monocular image and produces a depth map 260 as a result of processing the monocular image. The exact form of the depth model 250 may vary according to the implementation but is generally a convolutional encoder-decoder type of neural network.

Figure 3:
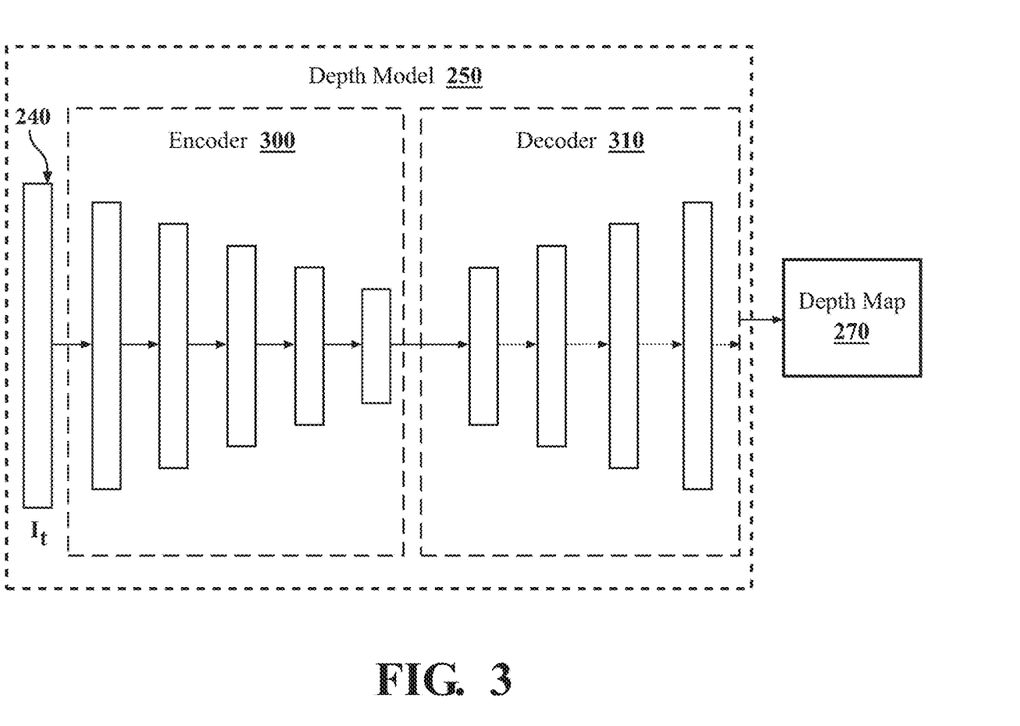
FIG. 3 illustrates one embodiment of a depth model that infers depth from a monocular image.
Figure 4:
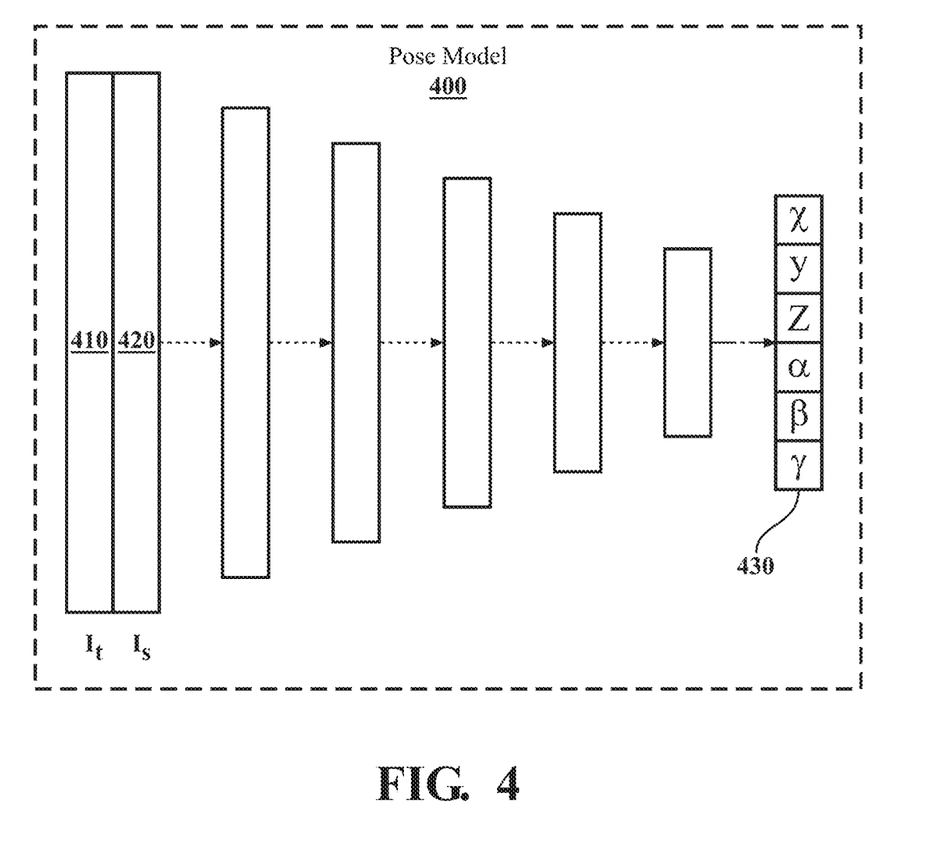
FIG. 4 illustrates one embodiment of a pose model that predicts rigid transformations of a pose between images.

As an additional explanation of one embodiment of the depth model 250 and the pose model 400, consider FIGS. 3-4. FIG. 3 illustrates a detailed view of the depth model 250, while FIG. 4 illustrates the pose model 400. In one embodiment, the depth model 250 has an encoder/decoder architecture. The encoder/decoder architecture generally includes a set of neural network layers, including convolutional components embodied as an encoder 300 (e.g., 2D and/or 3D convolutional layers forming an encoder) that flow into deconvolutional components embodied as a decoder 310 (e.g., 2D and/or 3D deconvolutional layers forming a decoder). In one approach, the encoder 300 accepts one of the images 240 at a time as an electronic input and processes the image to extract features therefrom. The features are, in general, aspects of the image that are indicative of spatial information that the image intrinsically encodes. As such, encoding layers that form the encoder function to, for example, fold (i.e., adapt dimensions of the feature map to retain the features) encoded features into separate channels, iteratively reducing spatial dimensions of the image 240 while packing additional channels with information about embedded states of the features. Thus, the addition of the extra channels avoids the lossy nature of the encoding process and facilitates the preservation of more information (e.g., feature details) about the original monocular image.

Accordingly, in one embodiment, the encoder 300 is comprised of multiple encoding layers formed from a combination of two-dimensional (2D) convolutional layers, packing blocks, and residual blocks. Moreover, the separate encoding layers generate outputs in the form of encoded feature maps (also referred to as tensors), which the encoding layers provide to subsequent layers in the depth model 250. As such, the encoder 300 includes a variety of separate layers that operate on the monocular image, and subsequently on derived/intermediate feature maps that convert the visual information of the monocular image into embedded state information in the form of encoded features of different channels.

In one embodiment, the decoder 310 unfolds (i.e., adapts dimensions of the tensor to extract the features) the previously encoded spatial information in order to derive the depth map 260 for a given image according to learned correlations associated with the encoded features. That is, the decoding layers generally function to up-sample, through sub-pixel convolutions and/or other mechanisms, the previously encoded features into the depth map 260, which may be provided at different resolutions. In one embodiment, the decoding layers comprise unpacking blocks, two-dimensional convolutional layers, and inverse depth layers that function as output layers for different scales of the feature map. The depth map 260 is, in one embodiment, a data structure corresponding to the input image that indicates distances/depths to objects/features represented therein. Additionally, in one embodiment, the depth map 260 is a tensor with separate data values indicating depths for corresponding locations in the image on a per-pixel basis.

Moreover, the depth model 250 can further include skip connections for providing residual information between the encoder 300 and the decoder 310 to facilitate memory of higher-level features between the separate components. While a particular encoder/decoder architecture is discussed, as previously noted, the depth model 250, in various approaches, may take different forms and generally functions to process the monocular images and provide depth maps that are per-pixel estimates about distances of objects/features depicted in the images.

Continuing to FIG. 4, the pose model 400 accepts two monocular images (i.e., a source image and a target image) of the same scene as an electronic input and processes the monocular images ($I_t$, $I_s$) 410/420 of the images 240 to produce estimates of camera ego-motion in the form of a set of 6 degree-of-freedom (DOF) transformations 430 between the two images. As part of the current approach, the depth system 170 uses the target image ($I_t$) with multiple separate source images ($I_s$) to generate the cost volume. Thus, use of the target image ($I_t$) may be repeated with different frames that are used as the source image ($I_s$). Of course, the depth system 170 may also generate the cost volume for a single source image.

The pose model 400 itself is, for example, a convolutional neural network (CNN) or another learning model that is differentiable and performs a dimensional reduction of the input images to produce the transformation 430. In one arrangement, the pose model 400 includes 7 stride-2 convolutions, a 1×1 convolution with 6*(N−1) output channels corresponding to 3 Euler angles and a 3-D translation for one of the images (source image $I_s$), and global average pooling to aggregate predictions at all spatial locations. The transformation 430 is, in one embodiment, a 6 DOF rigid-body transformation belonging to the special Euclidean group SE(3) that represents the change in pose between the pair of images provided as inputs to the model 250. In any case, the pose model 400 performs a dimensional reduction of the monocular images to derive the transformation 430 therefrom.

As an additional note, while the depth model 250, and the pose model 400 are shown as discrete units separate from the network module 220, the depth model 250, and the pose model 400 are, in one or more embodiments, generally integrated with the network module 220. That is, the network module 220 functions to execute various processes of the models 250/400 and use various data structures of the models 250/400 in support of such execution. Accordingly, in one embodiment, the network module 220 includes instructions that function to control the processor 110 to generate the depth map 260 using the depth model 250, and generate the transformation 430 using the pose model 400.

Figure 5:
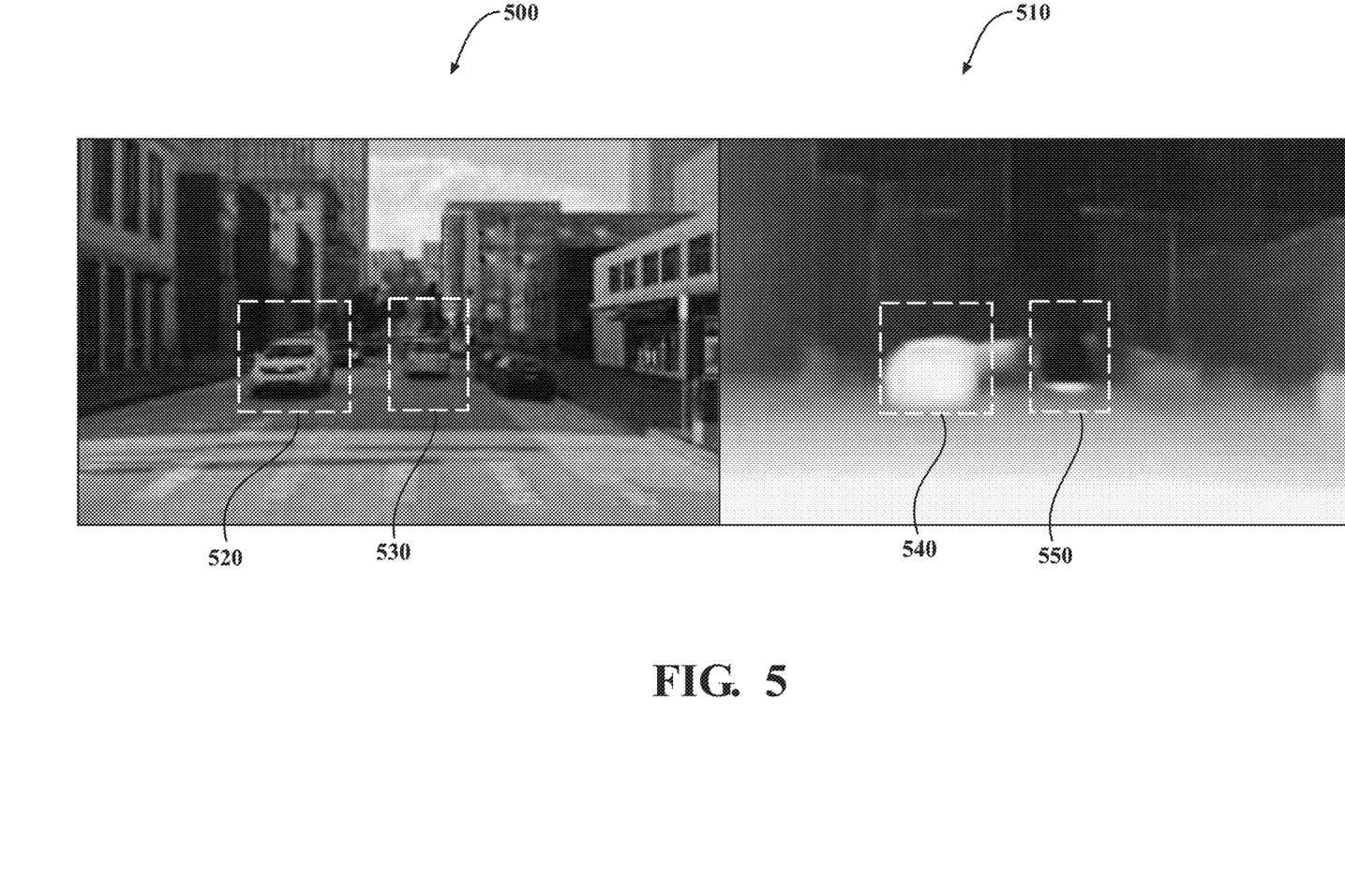
FIG. 5 illustrates one embodiment of an image and an associated depth map with anomalies.

With reference to FIG. 5, one example of an input image 500 and an associated depth map 510 is shown. The image 500 depicts a street scene in an urban environment with various buildings, road/lane markings, and objects present. In particular, a first vehicle 520 and a second vehicle 530 are shown in the image 500. The first vehicle 520 is moving toward the camera capturing the image 500, while the second vehicle 530 is moving at a speed that is substantially similar to the camera. As a result of this movement, the depth map 510 derived by the depth model 250 depicts the first vehicle 520 as a grouping of points 540 having a location that is closer than the actual first vehicle 520 because of the relative motion. Moreover, depth map 510 depicts another grouping of points 550 associated with the second vehicle as having an infinite depth because of the matched/similar speed of the second vehicle 530 relative to the camera. Accordingly, the depth map 510 depicts various anomalies associated with dynamic objects in a scene. It should be appreciated that as a result of these anomalies, the corresponding photometric loss values exhibit distinctive characteristics for the surrounding regions that can facilitate directly identifying anomalies and masking the associated erroneous values, as discussed further subsequently.

As a further explanation of the training architecture formed in relation to the depth model 250 and the pose model 400, further consider FIG. 2. The network module 220 generally includes instructions that function to control the processor 110 to execute various actions associated with the models 250/400. For example, in one embodiment, the network module 220 functions to process a first source image (also referred to as an input image herein) according to the depth model 250 to produce the depth map 260 for training. The network module 220 also functions to execute the pose model 400 to produce the transformation 430, which functions as a basis for warping the depth map 260 from which the network module 220 generates the photometric loss as will be explained further subsequently. As mentioned previously and as explained in further detail subsequently, the depth system 170 warps values of the depth map into a frame of the target image storing the warped values in, for example, a cost volume until the loss is calculated from the values. It should be noted that while a cost volume is discussed, in further approaches, the particular mechanism of storing and comparing loss values may differ or may include determining loss values on a per-pixel basis and generating the histograms from neighboring pixel loss values.

In any case, the network module 220 synthesizes the depth values into an inferred form of the target image and projects the values into the cost volume according to the depth value to provide for subsequently generating the photometric loss. As further explanation, consider the self-supervised loss context for structure from motion (SfM), which involves the network module 220 being generally configured with a goal of (i) a monocular depth model $f_D$: I→D (e.g., depth model 250), that predicts the scale-ambiguous depth $\hat{D}=f_D(I(p))$ for every pixel p in the target image $I_t$; and (ii) a monocular ego-motion estimator $f_x:(I_t, I_s)$ (e.g., pose model 400), that predicts the set of 6-DoF rigid-body transformations for all s∈S given by $$x_{t \to s} = \begin{pmatrix} R & t \\ 0 & 1 \end{pmatrix} \in SE, \tag{3}$$

between the target image $I_t$ and the set of source images $I_s \in I_S$ considered as part of the temporal context. As a point of implementation, in one or more embodiments, the network module 220 uses various frames $I_{t-1}$ and $I_{t+1}$ as source images, although a larger context, as previously noted, is implemented in various arrangements (e.g., ±5 images). It should be appreciated that the images relate to the target image ($I_t$) by depicting the same scene and via the transformations when generating a cost volume.

The network module 220, in at least one arrangement, implements the training objective for the depth model 250 according to various components. The components include a self-supervised term (e.g., photometric loss) that operates on appearance matching $\mathcal{L}_p$, between the target image $I_t$ and the warped values of synthesized images $I_{s \to t}$ (also annotated as $\hat{I}_t$) from the context set $S=\{I_s\}_{s=1}^S$, which may further include masking $M_p$ and depth smoothness $\mathcal{L}_{smooth}$ although a sampling process may avoid the use of masking and smoothness in at least one approach.

$$\mathcal{L}(I_t,\hat{I}_t)=\mathcal{L}_p \odot \mathcal{M}_p + \lambda_1 \mathcal{L}_{smooth} \tag{1}$$

$M_p$ is a binary mask that avoids computing the photometric loss on the pixels that do not have a valid mapping (e.g., pixels from the separate images that do not project onto the target image given the estimated depth). $M_p$ is also implemented, in at least one arrangement, to mask values identified as being associated with anomalies, such as those shown in FIG. 5. Accordingly, when the network module 220 identifies the anomalies from analysis of the histograms 270, the network module 220 can then use the mask $M_p$ to remove the erroneous values from consideration in the overall training process.

$\lambda_1, \lambda_2$ represent weights for adjusting the loss terms in eq (1). $\mathcal{L}_p$ represents appearance matching loss and is implemented according to, in one embodiment, a pixel-level similarity between the target image $I_t$ and the synthesized image $\hat{I}_t$ using a structural similarity (SSIM) term combined with an L1 pixel-wise loss term inducing an overall photometric loss as shown in equation (2).

$$\mathcal{L}_p(I_t, \hat{I}_t) = \alpha \frac{1 - SSIM(I_t, \hat{I}_t)}{2} + (1 - \alpha)\|I_t - \hat{I}_t\| \tag{2}$$

While multi-view projective geometry provides strong cues for self-supervision, errors due to parallax and out-of-bounds objects have an undesirable effect incurred on the photometric loss that can include added noise to the training. Accordingly, in one or more approaches, the network module 220 can mitigate these effects by calculating the minimum photometric loss per pixel for the source image according to (3), which, as implemented in the present disclosure, may instead be based on the minimum for individual bins.

$$\mathcal{L}_p(I_t, S) = \min_{s \in S} \mathcal{L}_p(I_t, I_{s \to t}) \tag{3}$$

The intuition involves the same pixel not occluding or being out-of-bounds in all context images, and that the association with minimal photometric loss should be the correct association. The mask ($M_p$) removes pixels that have appearance loss that does not change between frames and that may be associated with various anomalies, which includes static scenes and dynamic objects moving at a similar speed as the camera as identified per the analysis of the histograms 270 in some instances.

$$M_p = \left(\min_{s \in S} \mathcal{L}_p(I_t, I_s) > \min_{s \in S} \mathcal{L}_p(I_t, I_{s \to t})\right) \tag{4}$$

$\mathcal{L}_s$ represents depth smoothness loss and is implemented to regularize the depth in textureless low-image gradient regions, as shown in equation (5). The smoothness loss is an edge-aware term that is weighted for separate pyramid levels starting from 1 and decaying by a factor of two for the separate scales.

$$\mathcal{L}_s(\hat{D}_t)=|\delta_x \hat{D}_t|e^{-|\delta_x I_t|}+|\delta_y \hat{D}_t|e^{-|\delta_y I_t|} \tag{5}$$

Thus, the network module 220, in one approach, calculates the appearance-based loss according to the above to include the photometric loss, the mask, and the depth smoothness terms for the self-supervised training. However, as mentioned previously, in one or more arrangements, the appearance-based loss may solely include the photometric loss without the additional terms for smoothness and with masking relying on the determinations of the network module 220 according to analysis of the histograms 270. Through this training, the depth model 250 develops a learned prior of the monocular images as embodied by the internal parameters of the model 250 from the training on the images. In general, the model 250 develops the learned understanding about how depth relates to various aspects of an image according to, for example, size, perspective, and so on without noise associated with anomalies from dynamic objects.

It should be appreciated that the network module 220, in one or more configurations, trains the depth model 250 and the pose model 400 together in an iterative manner over the training data embodied by the images 240 that includes a plurality of monocular images from video. Through the process of training the model 250, the network module 220 adjusts various hyper-parameters in the depth model 250 to fine-tune the functional blocks included therein. Through this training process, the depth model 250 develops a learned prior of the monocular images as embodied by the internal parameters. In general, the depth model 250 develops the learned understanding about how depth relates to various aspects of an image according to, for example, size, perspective, and so on. Consequently, the network module 220 can provide the resulting trained depth model 250 in the depth system 170 to estimate depths from monocular images that do not include an explicit modality identifying the depths. In further aspects, the network module 220 may provide the depth model 250 to other systems that are remote from the depth system 170 once trained to perform similar tasks. In this way, the depth system 170 functions to improve the accuracy of the depth model 250 while avoiding difficulties with photometric losses associated with anomalies in training images.

Figure 6:
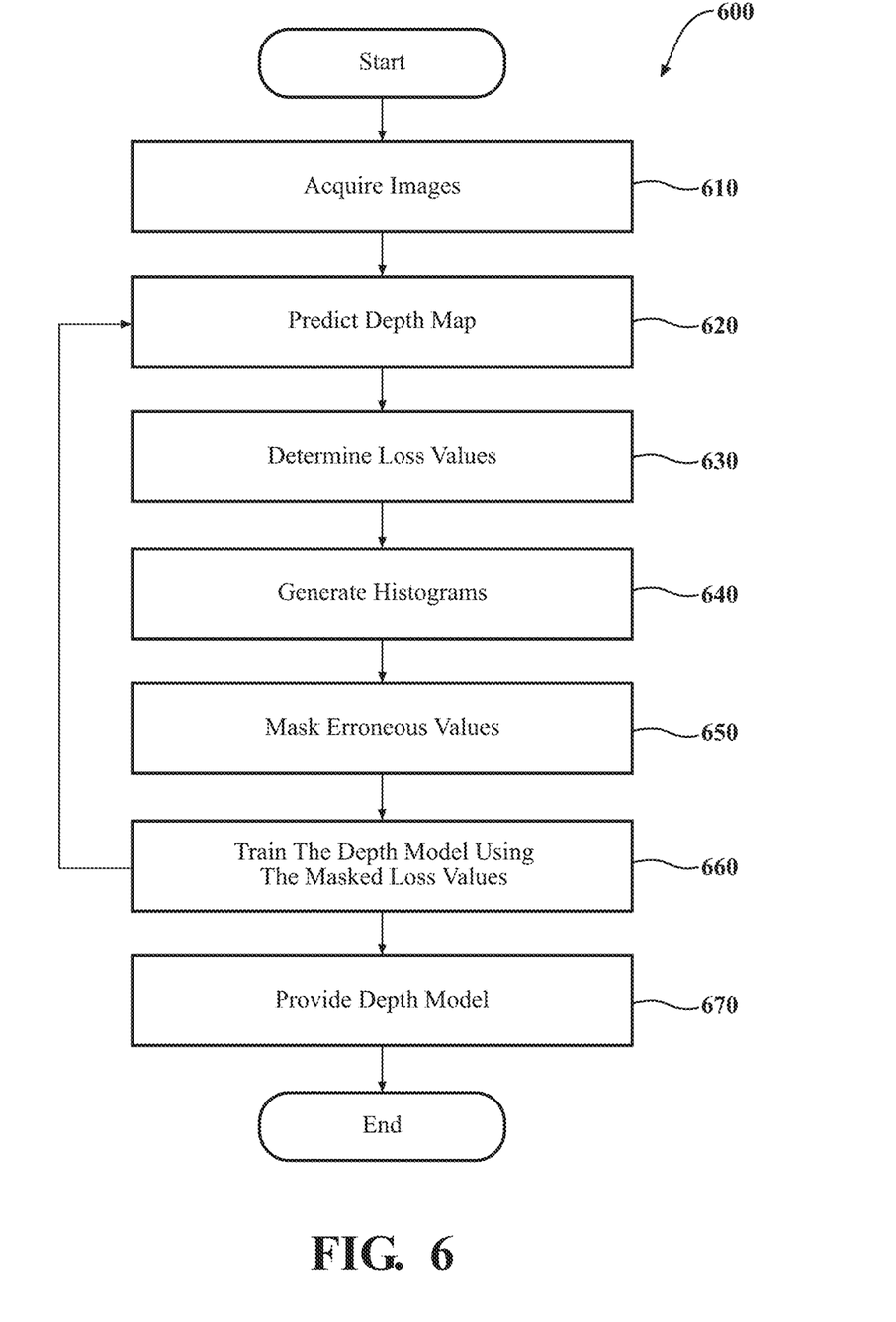
FIG. 6 is a flowchart illustrating one embodiment of a method for training a depth model.

FIG. 6 illustrates a flowchart of a method 600 that is associated with training a depth model using histograms. Method 600 will be discussed from the perspective of the depth system 170. While method 600 is discussed in combination with the depth system 170, it should be appreciated that the method 600 is not limited to being implemented within the depth system 170 but is instead one example of a system that may implement the method 600.

At 610, the network module 220 acquires the images 240. As previously outlined, the images 240 are derived from a monocular video for training and are grouped into sets such that a set of images are captured within a defined time of one another in order to depict a common scene. This is generally distinct from inference where the images 240 do not have an explicit relationship. In any case, as noted, the images 240 are monocular images having characteristics defined according to a camera and associated systems that capture the images 240.

At 620, the network module 220 predicts depth values (i.e., a depth map 260) from one of the images 240 that is an input image using the depth model 250. The network module 220 uses the depth model 250 to infer depth of a scene depicted by the input image. While a single image is discussed, the network module 220, in at least one arrangement, uses the depth model 250 to predict depth values for multiple ones of the images 240 that are, for example, part of a set depicting the same scene.

Additionally, in at least one approach, the network module 220 executes the pose model 400, at 620, to process the at least one source image and a second image that is the target image of the set to generate a transformation of poses between the images. In various arrangements, the network module 220 may further apply the pose model 400 to multiple image pairs to derive the different transformations. Although the pose model 400 may be used in various circumstances for generating transformations that have application beyond training, the depth system 170 generally uses the pose model 400 for training the depth model 250. Thus, when implemented as part of the depth system 170, the pose model 400 may reside in an idle state when the system 170 is not training the depth model 250. The pose model 400 functions to facilitate the self-supervised structure from motion (SfM) training regime by providing the transformation from which the network module 220 may derive further information (e.g., warped values) to help assess the performance of the depth model 250. Of course, as an additional aspect of using the pose model 400 to generate the transformations, the network module 220 also trains the pose model 400 and does so, in one embodiment, in combination with the depth model 250. Once the network module 220 has generated the depth values and the transformation, the network module 220 can then proceed with deriving the loss values and the histograms 270.

At 630, the network module 220 determines loss values according to a photometric loss function. In general, the loss values are photometric losses, which are appearance-based and derive from a comparison of a synthesized image created from the depth map 260 and the transformation in comparison with the target image. In one approach, the network module 220 uses a cost volume when generating the loss values. That is, for example, in determining the loss values the network module 220 generates a cost volume by projecting calculated loss values into bins (also referred to as different regions) of the cost volume, which are different divisions of a three-dimensional space depicted by the target image.

The network module 220 may generate a cost volume by initially generating a three-dimensional grid that forms the cost volume by dividing a scene depicted by a target image into separate three-dimensional grid spaces that are bins/regions of the scene. The grid spaces form distinct divisions of the three-dimensional space at defined distances. As one example, the network module 220 divides the space at increments of one meter. Thus, each separate bin may be a one meter cube. In further arrangements, the size of the bins may vary but are generally of a size that provides for segmenting the space into cells that are relatively larger than, for example, space represented by pixels.

In any case, the network module 220 stores the loss values in the associated bins. In one arrangement, the process of determining the loss values and creating the cost volume involves synthesizing an inferred image from the depth values of the depth map 260 and projecting associated pixel values into the cost volume at depths defined by the depth values for the associated pixel values. The network module 220 derives the synthesized image from the depth map 260 as an inferred form of the target image. Thus, the depth map 260 from the source image is warped and synthesized into a synthetic version of the target image for which pixel values are projected into the cost volume. As such, the cost volume is initially populated with the pixel values of the synthetic image that are projected into the cost volume at depths of corresponding values from the depth map 260.

As further explanation of the cost volume, the cost volume is representative of how the network module 220 may divide a scene depicted by a target image into separate bins. That is, as one example, a single bin represents a single three-dimensional division of a given scene. The network module 220 generally divides the scene at defined distances that are according to a size of the bin. Each separate subsequent division longitudinally represents a different depth within the scene from a camera that captured the target image. Moreover, the depth system 170 further divides each separate depth into the respective bins. Each bin is a three-dimensional cell having a height, width, and defined depth. In one example, each separate bin may cover one meter of depth. Depending on a field-of-view for the capturing camera, the cost volume may have more or fewer bins per depth. Additionally, the depth of each bin may also vary according to the implementation. In any case, the depth system 170 uses the cost volume to segment the scene into separate bins as a mechanism to associate locally related pixels for generating the histograms 270.

Returning to the generation of the loss values via the synthetic image, in one approach, the network module 220 synthesizes a target image $\hat{I}_t$ from the depth map 260 and the transformation 430. This synthesized target image $\hat{I}_t$ generally corresponds to the training target image $I_t$ as opposed to the source image $I_s$ to which the depth map 260 $\hat{D}_t$ corresponds. Thus, the network module 220 generates the synthetic target image $\hat{I}_t$ as a regenerated view of the same scene depicted by the target image $I_t$. In one embodiment, the network module 220 generates the synthetic image according to a warping operation that functions to adapt a viewpoint of the camera in order to recover the original target image as the synthesized image. In various approaches, the network module 220 may implement different algorithms to perform the warping, which may include a convolutional neural network (CNN) or other machine learning architecture, such as a generative network. Whichever approach is undertaken, the pixel values of the synthetic image serve as a point of comparison in order to identify the accuracy of the depth model 250 in producing the depth map $\hat{D}_t$.

The network module 220 generates a photometric loss relative to the target image. In one configuration, the network module 220 generates the photometric loss for the separate bins of the cost volume. For example, the network module 220 calculates the loss values as photometric losses in relation to the target image for separate values of the bins. In general, the network module 220 performs this on a per-pixel basis as a one-to-one comparison between the synthesized image and the target image. Thus, pixel values of the target image that correspond with the pixel values of the synthetic image within the bins are used to determine the photometric loss. In one approach, the network module 220 determines the correspondence between the target image and values in the cost volume via a 2D coordinate matching and then separately determines the photometric losses for each bin. In this way, the network module 220 generates the photometric losses and associates the photometric losses with other locally-related values.

It should be appreciated that while a cost volume is discussed, in further implementations, the network module 220 may use alternative arrangements other than a cost volume to associate the values. For example, the network module 220 may instead group neighboring pixels. In any case, the network module 220 calculates the loss values at 630.

At 640, the network module 220 generates the histograms 270 for the loss values corresponding to different regions of the target image. As a general matter, the histograms 270 map photometric losses embodied by the loss values for the different regions in relation to a spectrum of possible losses for the photometric losses. That is, for any given image there is a range of possible loss values (e.g., 0-100). Thus, the network module 220 for a given region of the cost volume maps the loss values against the spectrum. Accordingly, the resulting histogram depicts an approximate representation of a distribution of loss values for the specific region against possible values. Therefore, the network module 220 generates the histograms 270 for the different regions/bins within the cost volume in order to characterize a behavior of the loss values across the depth map 260 and in relation to the target image. It should be appreciated that separate ones of the histograms 270 characterize groups of loss values associated with different regions of the depth map 260 according to bins/regions defined by the cost volume. In this way, the sections of the depth map 260 that have similar depths are likewise characterized in relation to behaviors of the loss values.

At 650, the network module 220 masks erroneous values from the loss values. For example, in one approach, the network module 220 identifies which of the loss values are erroneous (i.e., inaccurate and associated with anomalies in the depth map 260). One way in which the network module 220 may determine whether a loss value is erroneous is by comparing the histograms 270 with a mask threshold. The mask threshold, in one arrangement, defines a particular value of the histogram or behavior of the values included in the histogram that indicate when the loss values are indicative of erroneous values. For example, when an object is moving at the same/similar velocity as the camera and an area of infinite depth is erroneously formed in depth map 260 because of this, the resulting photometric loss for the region in the cost volume will show characteristics indicating this since the similarity between the synthesized image and the target image will not align well. Similarly, for objects moving toward the camera, the histogram will display a particular pattern. As such, the mask threshold embodies the noted patterns and the network module 220 can convolve the threshold comparison over the different regions to identify the presence of the erroneous values.

In one approach, the network module 220 masks the values by removing the values from consideration when training the depth model 250. Removing the erroneous values may include applying a binary mask that prevents the network module 220 from using the associated loss values. Alternatively, the network module 220 may simply remove the loss values from memory. In this way, the network module 220 prevents the use of the erroneous values in training the depth model 250, thereby improving the accuracy of the training process and the depth model 250 overall. As such, the depth model 250 is not trained with noise from the erroneous values and can improve more quickly while also leveraging a more diverse dataset for training that can include dynamic objects.

At 660, the network module 220 trains the depth model 250 according to the loss values of the cost volume. Training the depth model includes minimizing error embodied by the loss values for the cost volume, where the cost volume is a persistent space relative to a target image. Thus, the cost volume embodies losses for specific spaces in a scene (excepting the masked values) relative to the target image that are used to update the depth model 250. Thus, the network module 220 uses this appearance-based loss to account for pixel-level similarities and irregularities between the synthesized image derived from depth predictions of the depth model 250 and the target image that is the original input into the depth model 250.

In general, the network module 220 updates the depth model 250 according to the loss values as determined by the network module 220. In one embodiment, the network module 220 updates the depth model 250 using the loss values to adapt weights in the model 250. Therefore, the disclosed training approach implemented by the depth system 170 improves the understanding of the depth model 250 while using the self-supervised loss without any additional supervision for the depth model 250. In this way, the depth system 170 improves the depth model 250 to produce improved depth estimates that translate into improved situational awareness of the implementing device (e.g., the vehicle 100), and improved abilities to navigate and perform other functions therefrom. Moreover, by using the cost volume in lieu of per pixel values, the depth system 170 avoids the noted difficulties with local minima and other aberrations that occur on a per-pixel level.

At 670, the network module 220 provides the depth model 250. In one arrangement, the network module 220 provides the depth model 250 upon completion of training, which may occur after a defined number of iterations of the training process over a plurality of images in a set of training data or according to a desired residual loss value from subsequent iterations of training. The resulting depth model 250 can then be implemented in the vehicle 100 to improve perception for various tasks. It should be appreciated that the network module 220 can provide an electronic output indicating depth within a perceived scene. As one example, the network module 220, in one approach, uses the outputs to map locations of obstacles in the surrounding environment and plan a trajectory that safely navigates the obstacles. Thus, the network module 220 may, in one embodiment, control the vehicle 100 to navigate through the surrounding environment according to the outputs of the depth model 250.

In further aspects, the network module 220 conveys the electronic outputs to further internal systems/components of the vehicle 100, such as the automated driving module 160. By way of example, in one arrangement, the network module 220 generates the depth map using the model 250 and conveys the electronic outputs to the automated driving module 160. In this way, the depth system 170 informs the automated driving module 160 of depth estimates, objects, and so on to improve situational awareness and planning of the module 160. It should be appreciated that the automated driving module 160 is indicated as one example, and, in further arrangements, the network module 220 may provide the outputs to the module 160 and/or other components in parallel or as a separate communication.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles.

The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140 and, thus, may be partially or fully autonomous.

The processor(s) 110, the depth system 170, and/or the autonomous driving module(s) 160 can be operatively connected to communicate with the various vehicle systems 140 and/or individual components thereof. For example, returning to FIG. 1, the processor(s) 110, the depth system 170, and/or the autonomous driving module(s) 160 can be in communication to send and/or receive information from the various vehicle systems 140 to control the movement, speed, maneuvering, heading, direction, etc. of the vehicle 100. The processor(s) 110, the depth system 170, and/or the autonomous driving module(s) 160 may control some or all of these vehicle systems 140.

The processor(s) 110, the depth system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the autonomous driving module(s) 160 can control the direction and/or speed of the vehicle 100. The processor(s) 110, the depth system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof

What is claimed is:

1. A depth system, comprising:
one or more processors;
a memory communicably couples to the one or more processors and storing instructions that, when executed by the one or more processors, cause the one or more processors to:
determine loss values according to a photometric loss function for self-supervised training, the loss values being associated with a depth map derived from an input image that is a monocular image;
generate histograms for the loss values corresponding to different regions of a target image to map photometric losses embodied by the loss values for respective ones of the different regions of a target image to map photometric losses embodied by the loss values for respective ones of the different regions in relation to a spectrum of possible losses for the photometric losses; and
responsive to identifying erroneous values of the loss the values using the histograms, mask the erroneous values to avoid considering the erroneous values during training of a depth model.

2. The depth system of claim 1, wherein the instructions to identify the erroneous values include instructions to compare the histograms to a mask threshold to determine when associated ones of the loss values correspond to anomalies in the depth map, and
wherein the instructions to mask the erroneous values include instructions to remove the erroneous values from the loss values for training.

3. The depth system of claim 1, wherein the instructions to determine the loss values include instructions to generate a cost volume by sampling the loss values corresponding to bins of the cost volume, the bins corresponding to the different regions.

4. The depth system of claim 3, wherein the instructions to generate the cost volume include instructions to divide a scene depicted by a target image associated with the cost volume that is separate from the input image into separate three-dimensional grid spaces that are the bins, and wherein the grid spaces forming distinct divisions of a 3D space of the scene at defined distances.

5. The depth system of claim 1, wherein the instructions to determine the loss values include instructions to calculate the loss values as photometric losses in relation to a target image.

6. The depth system of claim 1, wherein the instructions further include instructions to:
predict the depth map includes predicting multiple depth maps by applying the depth model to multiple images to generate the multiple depth maps; and
train the depth model according to the loss values of a cost volume without considering the erroneous values that have been masked.

7. The depth system of claim 1, wherein the instructions further include instructions to train the depth model according to a self-supervised monocular structure-from-motion (sfm) process that uses a monocular video of a surrounding environment collected while a camera is in motion through the surrounding environment to generate a plurality of images including the input image for input to the depth model.

8. A non-transitory computer readable medium including instructions that, when executed by one or more processors, cause the one or more processors to:
determine loss values according to a photometric loss function for self-supervised training, the loss values being associated with a depth map derived from an input image that is a monocular image;
generate histograms for the loss values corresponding to different regions of a target image to map photometric losses embodied by the loss values for respective ones of the different regions of a target image to map photometric losses embodied by the loss values for respective ones of the different regions in relation to a spectrum of possible losses for the photometric losses; and
responsive to identifying erroneous values of the loss the values using the histograms, mask the erroneous values to avoid considering the erroneous values during training of a depth model.

9. The non-transitory computer-readable medium of claim 8, wherein the instructions to identify the erroneous values include instructions to compare the histograms to a mask threshold to determine when associated ones of the loss values correspond to anomalies in the depth map, and wherein the instructions to mask the erroneous values include instructions to remove the erroneous values from the loss values for training.

10. The non-transitory computer-readable medium of claim 8, wherein the instructions to determine the loss values include instructions to generate a cost volume by sampling the loss values corresponding to bins of the cost volume, the bins corresponding to the different regions.

11. The non-transitory computer-readable medium of claim 10, wherein the instructions to generate the cost volume include instructions to divide a scene depicted by a target image associated with the cost volume that is separate from the input image into separate three-dimensional grid spaces that are the bins, and wherein the grid spaces forming distinct divisions of a 3D space of the scene at defined distances.

12. A method, comprising:
determining loss values according to a photometric loss function for self-supervised training, the loss values being associated with a depth map derived from an input image that is a monocular image;
generating histograms for the loss values corresponding to different regions of a target image to map photometric losses embodied by the loss values for respective ones of the different regions in relation to a spectrum of possible losses for the photometric losses; and
responsive to identifying erroneous values of the loss values using the histograms, masking the erroneous values to avoid considering the erroneous values during training of a depth model.

13. The method of claim 12, wherein identifying the erroneous values includes comparing the histograms to a mask threshold to determine when associated ones of the loss values correspond to anomalies in the depth map, and wherein masking the erroneous values includes removing the erroneous values from the loss values for training.

14. The method of claim 12, wherein determining the loss values includes generating a cost volume by sampling the loss values corresponding to bins of the cost volume, the bins corresponding to the different regions.

15. The method of claim 14, wherein generating the cost volume includes dividing a scene depicted by a target image associated with the cost volume that is separate from the input image into separate three-dimensional grid spaces that are the bins, and wherein the grid spaces forming distinct divisions of a 3D space of the scene at defined distances.

16. The method of claim 12, wherein determining the loss values includes calculating the loss values as photometric losses in relation to a target image.

17. The method of claim 12, further comprising:
predicting the depth map includes predicting multiple depth maps by applying the depth model to multiple images to generate the multiple depth maps; and
training the depth model according to the loss values of a cost volume without considering the erroneous values that have been masked.

* * * * *